L. BAMBERGER.
BEEHIVE.
APPLICATION FILED JULY 19, 1920.
1,414,393.
Patented May 2, 1922.
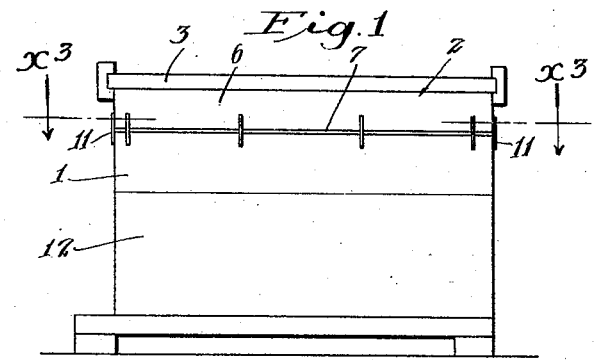
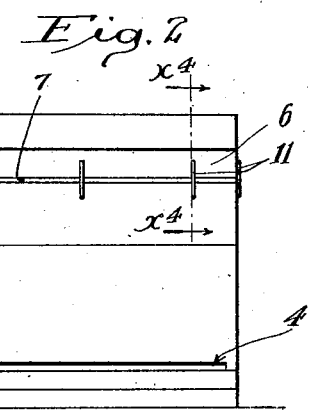
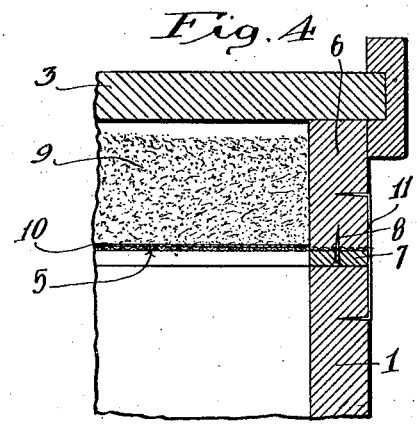
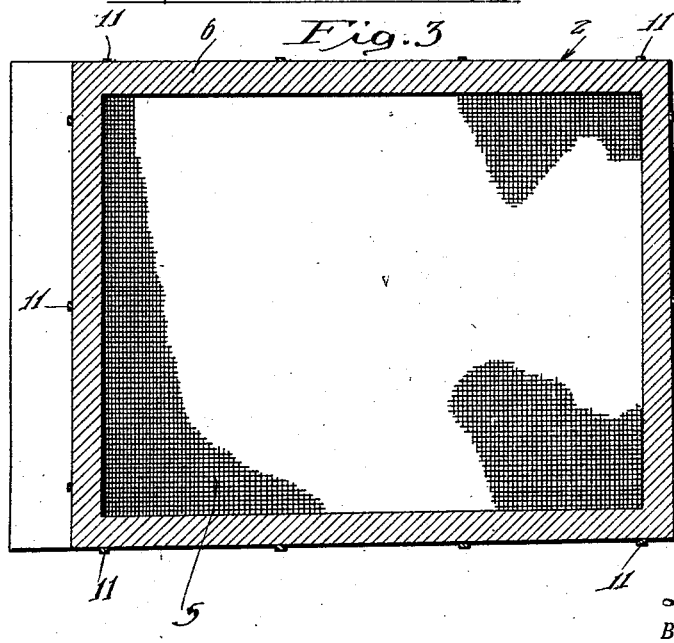
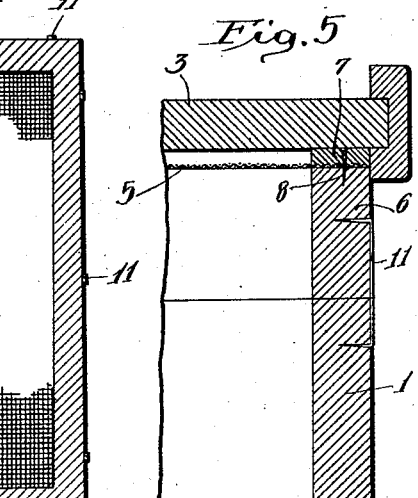
INVENTOR.
Lester Bamberger
BY
ATTORNEY

UNITED STATES PATENT OFFICE.

LESTER BAMBERGER, OF RIVERSIDE, CALIFORNIA.

BEEHIVE.

1,414,393.          Specification of Letters Patent.          Patented May 2, 1922.

Application filed July 19, 1920. Serial No. 397,259.

*To all whom it may concern:*

Be it known that I, LESTER BAMBERGER, a citizen of the United States, residing at Riverside, in the county of Riverside and State of California, have invented a new and useful Beehive, of which the following is a specification.

This invention relates more particularly to a bee hive of the character having a heat and cold insulator in its upper portion to maintain the upper portion of the hive at as nearly a uniform temperature as possible without the employment of artificial heating and cooling methods.

In the keeping of bees for the commercial production of honey, in order to obtain a maximum output of honey at the proper season and to insure maximum propagation of the bees, to expand the colony, the retention of the animal heat produced by the bees in the hive at cooler atmospheric temperatures and the insulation of the hive against higher external temperatures is necessary. In California, as well as certain other parts of the world, the difference between maximum and minimum temperatures in the day time and at night, respectively, is considerable and if the bees are not protected against such changes the production of honey and the reproduction of the bees are adversely affected.

Under the climatic conditions present in California, when the hive is not protected in some way against the relatively great changes of temperature, the bees waste a large amount of their energy in protecting themselves from the colder temperatures, especially at night, and, as the temperature increases greatly in the daytime, even during the winter season when the bees should be more or less dormant, the warm temperature outside of the hive causes the bees to leave the hive and hunt for nectar. This, of course, is a waste of the bees' energy and, therefore, when the earlier blooms occur the bees are not up to their full strength and are not capable of taking full advantage of the flowering crops. This is especially true in relation to the orange blossoms which appear comparatively early in the season, as early as January.

An object of this invention is to provide a simple and effective construction whereby the bees will be amply protected against extremes of temperature.

Another object is to provide a construction which will facilitate the quick placing of the insulation in the hive when the hive has been placed in a location, and ready removal of the insulation therefrom when it is desired to transport the hive from one location to another, as is done to a considerable extent in California in order to take advantage of the different flowering crops and shrubs at the different elevations provided by the valleys, sea coasts and mountain slopes.

Another object is to provide a construction which can be readily used to insulate the hive during the time it is located for the nectar-gathering operation of the bees, and also thoroughly ventilate the hive during the periods of changing the hive from one location to another. When the bees are taken from one location to another, it is very essential that the hive be well ventilated so that the bees receive plenty of fresh air.

From the foregoing it will be clear that my invention serves the double purpose of insulating the hive against temperature changes and also ventilating the hive.

The accompanying drawings illustrate the invention:

Figure 1 is a side elevation of a bee hive constructed in accordance with the provisions of this invention.

Fig. 2 is a front elevation of Fig. 1.

Fig. 3 is an enlarged plan section on line indicated by $x^3$—$x^3$, Fig. 1, the foraminous member of the screen being fragmentarily shown.

Fig. 4 is an enlarged fragmental vertical section on line indicated by $x^4$—$x^4$, Fig. 2.

Fig. 5 is a sectional elevation similar to Fig. 4, showing the screen reversed without the insulating material therein.

The hive comprises four separable sections, a lower member 12, a "super" 1, an intermediate member 2 and a cover 3. The member 12 may be of the usual or any preferred construction and is provided in its front wall with a horizontal slot 4 forming the entrance and exit of the hive. Also the super 1 may be of the usual construction for holding the honey-boxes, not shown. The intermediate member 2 rests upon the upper edge of the super 1 and forms a screen, the foraminous member thereof being indicated at 5. The foraminous member 5 is preferably in the form of woven wire as shown in the drawings. The frame of the screen comprises a relatively deep member 6 and a relatively shallow member 7, the foraminous member 5 being interposed between the members 6, 7 and all of the members of the screen being securely held together by nails 8 or their equivalents.

In Fig. 4 the intermediate member 2 is shown with the deeper member 6 placed uppermost so as to form a relatively deep tray to hold heat and cold insulating material indicated at 9. Said insulating material may be sawdust, shavings or any other material suited to the purpose. The insulating material may be placed directly upon the foraminous member, but preferably a paper or other imperforate member 10 is laid on the foraminous member and the insulating material placed on the imperforate member so that the finer particles of the insulating material cannot fall into the super. The super and intermediate member 2 may, if desired, be detachably held against relative shifting by staples 11 or any other suitable fastening devices.

In Fig. 5 the intermediate member 2 is shown in reverse position from that shown in Fig. 4. In Fig. 5 the shallower member 7 of the screen is uppermost, thus producing a space of relatively great depth between the plane of the upper edge of the super 1 and the foraminous member 5. This space permits the bees to cluster on the under surface of the foraminous member 5, during transportation of the hive from one location to another. During such transportation the cover 3 is preferably left off, unless because of rain or for some other reason it should be more desirable to have the cover in place over the screen.

In practice, when the hive has reached a suitable location for the bees to gather nectar, the screen 2 will be placed in position with the deeper member uppermost and the imperforate member 10 will be laid on the foraminous member, and then sawdust or other suitable insulating material will be placed in the screen. Since the animal heat from the bees rises it tends to escape through the cover of the hive unless such tendency is counteracted. This tendency of the heat to escape is overcome to a large extent by the insulating material 9. When the external temperature lowers, as at night, the insulating material will prevent the entrance of cold through the top of the hive. Also, when the external temperature is comparatively high and the sun is possibly shining upon the hive, the insulating material 9 will prevent, to a large extent, the transmission of heat to the interior of the hive, especially the upper portion thereof where the temperature would tend to be greatest.

When it becomes desirable to transport the hive from one location to another, the apiarist will remove the cover 3 and staples 11 and he will then lift off the screen 2 together with its contents, the insulating material 9, and will dump said insulating material from the screen into a suitable receptacle. He will then turn the screen upper side down and place it on the super 1 in the position shown in Fig. 5 and will fasten it in place by the staples 11.

The hive will then be transported to the new location and upon reaching the same the staples 11 will be loosened, the screen 2 taken off and reversed to its former position and the insulating material again placed in the screen. Then the cover will be placed on top of the screen.

I am aware that it is not new to insulate a hive, but by the construction described above the space occupied by the bees may be maintained at uniform temperature without excessive waste of energy of the bees in the hive. It is to be noted that the insulating material does not form a permanent packing between two fixed walls of a hive as has been heretofore suggested, but that said material is loose and can be readily removed by taking off the cover and dumping said material from the screen as above described.

It is also to be noted that because of the reversibility of the screen it can be used at all times, part of the time to hold the insulating material and part of the time as a ventilating top of the hive.

I claim:

A bee hive comprising a lower member, a super mounted on the lower member, a screen having deeper and shallower frame members and having a foraminous member between said frame members, the screen frame being of the same length and width as the super and removably mounted on the upper edge of the super, and a cover removably positioned on the upper edge of the screen and adapted to fit upon the upper edge of the super when the screen is removed, there being means detachably engaging the super and screen to prevent lateral shifting of the screen.

Signed at Riverside, California, this 10th day of July, 1920.

LESTER BAMBERGER.

Witnesses:
 GERTRUDE E. BAMBERGER,
 WM. T. DINSMORE.